(12) United States Patent
Hatano (10) Patent No.: US 12,146,436 B2
(45) Date of Patent: Nov. 19, 2024

(54) CONTROL DEVICE

(71) Applicant: TOYOTA JIDOSHA KABUSHIKI KAISHA, Toyota (JP)

(72) Inventor: Takato Hatano, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/408,333

(22) Filed: Jan. 9, 2024

(65) Prior Publication Data

US 2024/0229730 A1 Jul. 11, 2024

(30) Foreign Application Priority Data

Jan. 11, 2023 (JP) ................. 2023-002515

(51) Int. Cl.
*F02B 37/12* (2006.01)
*F02D 41/00* (2006.01)

(52) U.S. Cl.
CPC .......... *F02B 37/12* (2013.01); *F02D 41/0007* (2013.01); *F02B 2037/122* (2013.01)

(58) Field of Classification Search
CPC . F02B 37/12; F02B 2037/122; F02D 41/0007
See application file for complete search history.

(56) References Cited

U.S. PATENT DOCUMENTS

| | | | |
|---|---|---|---|
| 8,364,375 B2 * | 1/2013 | Chapman | G06Q 10/04 |
| | | | 701/100 |
| 10,060,346 B2 * | 8/2018 | Pfister | F02D 41/221 |
| 2011/0023848 A1 * | 2/2011 | Schwarte | F02B 37/004 |
| | | | 123/568.21 |
| 2012/0204560 A1 * | 8/2012 | Dixon | F02D 41/0007 |
| | | | 60/611 |
| 2012/0285420 A1 * | 11/2012 | Iwatani | F02M 26/05 |
| | | | 123/348 |
| 2014/0326225 A1 * | 11/2014 | Shioda | F01M 13/00 |
| | | | 123/559.1 |

(Continued)

FOREIGN PATENT DOCUMENTS

| | | | | |
|---|---|---|---|---|
| JP | 2006057511 A | * | 3/2006 | ............. F02B 37/18 |
| JP | 2016-151254 A | | 8/2016 | |

OTHER PUBLICATIONS

Machine translation of JP-2006057511-A, accessed May 29, 2024. (Year: 2024).*

*Primary Examiner* — Jonathan R Matthias
(74) *Attorney, Agent, or Firm* — Finnegan, Henderson, Farabow, Garrett and Dunner, LLP (57) ABSTRACT

As for a control device for a turbocharger including a turbine, disposed in an exhaust passage of an internal combustion engine, and a compressor, disposed in an intake passage of the internal combustion engine and driven by the turbine, the control device includes a control unit configured to control the turbine such that a boost pressure of the turbocharger in the intake passage becomes equal to or lower than an allowable value, a first calculation unit configured to calculate a decrease amount of a compressor efficiency of the compressor, and a second calculation unit configured to calculate the allowable value based on an intake air amount in the intake passage, in accordance with the decrease amount.

5 Claims, 5 Drawing Sheets

(56) References Cited

U.S. PATENT DOCUMENTS

2015/0275753 A1* 10/2015 Pfister .................... F02D 41/22
                                                    702/35
2017/0145905 A1*  5/2017 Yamane ................. F02B 37/04
2019/0024574 A1*  1/2019 Upadhyay ............ F04D 29/685

* cited by examiner

CONTROL DEVICE

CROSS-REFERENCE TO RELATED APPLICATION

This application is based upon and claims the benefit of priority of the prior Japanese Patent Application No. 2023-002515, filed on Jan. 11, 2023, the entire contents of which are incorporated herein by reference.

TECHNICAL FIELD

The present disclosure relates to a control device.

BACKGROUND

A turbocharger includes a compressor and a turbine disposed in an intake path and an exhaust path of an engine, respectively. For example, Japanese Unexamined Patent Application Publication No. 2016-151254 describes that an actuator is controlled such that a boost pressure in an intake passage becomes equal to or lower than an allowable boost pressure corresponding to an allowable upper limit rotational speed of a turbine in order to suppress damage caused by an excessively high rotational speed of the turbine.

However, for example, oil mist might be mixed into intake air from an exhaust system of the engine, and the oil mist might adhere to a compressor housing to form a deposit. As a result, the operation characteristics of the compressor might change over time and the allowable boost pressure might decrease. Thus, the boost pressure might exceed the allowable boost pressure.

SUMMARY

It is therefore an object of the present disclosure to provide a control device capable of suppressing damage to a turbocharger.

The above object is achieved by a control device for a turbocharger including a turbine, disposed in an exhaust passage of an internal combustion engine, and a compressor, disposed in an intake passage of the internal combustion engine and driven by the turbine, the control device including: a control unit configured to control the turbine such that a boost pressure of the turbocharger in the intake passage becomes equal to or lower than an allowable value; a first calculation unit configured to calculate a decrease amount of a compressor efficiency of the compressor; and a second calculation unit configured to calculate the allowable value based on an intake air amount in the intake passage, in accordance with the decrease amount.

The first calculation unit may be configured to calculate the compressor efficiency at time intervals, and to calculate the decrease amount based on a temporal change in the compressor efficiency.

The first calculation unit may be configured to calculate the decrease amount based on a first pressure and a first temperature on an upstream side of the compressor in the intake passage and on a second pressure and a second temperature on a downstream side of the compressor in the intake passage.

The first calculation unit may be configured to calculate the decrease amount based on a change in a control amount of the turbine.

The second calculation unit may be configured to calculate the allowable value based on data indicating a correlation between the compressor efficiency and the allowable value, in accordance with the decrease amount.

DETAILED DESCRIPTION (Configuration of Vehicle System)

Figure 1:
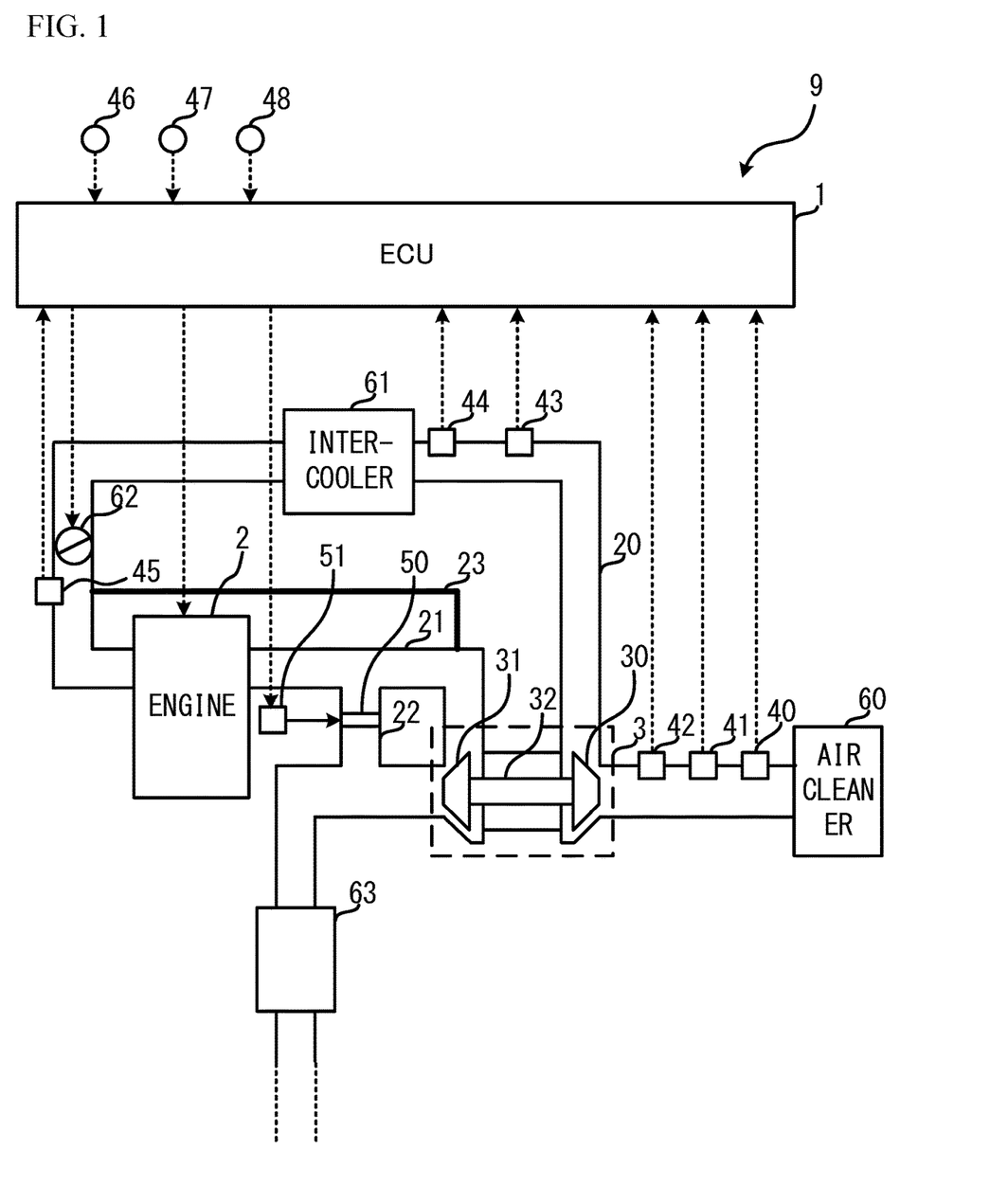
FIG. 1 is a configuration view illustrating an example of a system of a vehicle.

FIG. 1 is a configuration view illustrating an example of a system of a vehicle 9. The vehicle 9 is, for example, a gasoline vehicle. However, the vehicle 9 may be a diesel vehicle, a hybrid vehicle, an electric vehicle, or the like.

The vehicle 9 includes an Electronic Control Unit (ECU) 1, an engine 2, a turbocharger 3, an air cleaner 60, an intercooler 61, a throttle valve 62, a catalytic converter 63, an intake passage 20, an exhaust passage 21, a bypass passage 22, an Exhaust Gas Recirculation (EGR) flow passage 23, a wastegate valve (WG valve) 50, and an actuator 51. In FIG. 1, broken line arrows indicate control signals of the ECU 1 or detection signals of the sensors.

The engine 2 is an example of an internal combustion engine. The engine 2 takes in air from the intake passage 20 and mixes it with gasoline. The engine 2 burns the air-fuel mixture and discharges it from the exhaust passage 21. The EGR passage 23 connects the intake passage 20 and the exhaust passage 21, and recirculates a part of the exhaust gas to the intake passage 20. Although the engine 2 is a gasoline engine, it may be a diesel engine.

The air cleaner 60, the intercooler 61, and the throttle valve 62 are provided in this order from the upstream side. The catalytic converter 63 is provided in the exhaust passage 21.

The turbocharger 3 is, for example, a turbocharger, and includes a compressor 30 and a turbine 31 connected to each other via a turbine shaft 32. The compressor 30 is disposed downstream of the air cleaner 60 and upstream of the intercooler 61 in the intake passage 20. The turbine 31 is arranged upstream of the catalytic converter 63. The turbine 31 is rotated by the exhaust gas flowing through the exhaust passage 21. The compressor 30 is driven by the rotation of the turbine 31. Thus, the compressor 30 compresses the air.

The bypass passage 22 bypassing the turbine 31 is connected to the exhaust passage 21. The bypass passage 22 is provided with the WG valve 50 that adjusts the flow rate of the exhaust gas flowing from the engine 2 into the bypass passage 22. The actuator 51 adjusts the opening degree of the WG valve 50. Since the flow rate of the exhaust gas flowing through the bypass passage 22 changes in accordance with the opening degree of the WG valve 50, the exhaust gas flowing through the turbine 31 also changes accordingly. Thus, the rotational speed of the turbine 31 is controlled.

The vehicle 9 includes an inlet pressure sensor 40, an inlet temperature sensor 41, an air flow meter 42, an outlet pressure sensor 43, an outlet temperature sensor 44, an intake pressure sensor 45, an atmospheric pressure sensor 46, an accelerator opening degree sensor 47, and a crank position sensor 48. The ECU 1 collects the detection values of the inlet pressure sensor 40, the inlet temperature sensor 41, the air flow meter 42, the outlet pressure sensor 43, the outlet temperature sensor 44, the intake pressure sensor 45, the atmospheric pressure sensor 46, the accelerator opening degree sensor 47, and the crank position sensor 48, for example, at regular intervals.

The inlet pressure sensor 40, the inlet temperature sensor 41, and the air flow meter 42 are provided in the intake passage 20 on the upstream side of the compressor 30. The inlet pressure sensor 40 detects the pressure of air on the inlet side of the compressor 30. The inlet temperature sensor 41 detects the temperature of air on the inlet side of the compressor 30. The air flow meter 42 detects a flow rate per unit time of air flowing through the intake passage 20 on the upstream side of the compressor 30.

The outlet pressure sensor 43 and the outlet temperature sensor 44 are provided in the intake passage 20 on the downstream side of the compressor 30. The outlet pressure sensor 43 detects the pressure of air on the outlet side of the compressor 30. The outlet temperature sensor 44 detects the temperature of air on the outlet side of the compressor 30.

The intake pressure sensor 45 is provided in the intake passage 20 in the downstream side of the throttle valve 62. The intake pressure sensor 45 detects a boost pressure of the air taken into the engine 2.

The atmospheric pressure sensor 46 detects the atmospheric pressure around the vehicle 9. The accelerator opening degree sensor 47 detects an opening degree of an accelerator pedal (not illustrated). The crank position sensor 48 detects a rotation angle of a crankshaft (not illustrated) of the engine 2.

The ECU 1 is an example of a control device. The ECU 1 is a computer such as a microcontroller. The ECU 1 determines a target torque of the engine 2 in accordance with the accelerator opening degree sensor 47 and the like. The ECU 1 controls the ignition timing and the fuel injection amount of the engine 2, the opening degree of the throttle valve 62, and the like on the basis of the target torque.

In addition, the ECU 1 controls the turbine 31 such that the boost pressure of the turbocharger 3 becomes equal to or lower than an allowable value. Therefore, the turbocharger 3 is prevented from being damaged due to an excessive increase in the rotational speed of the turbine 31.
(Configuration of ECU)

Figure 2:
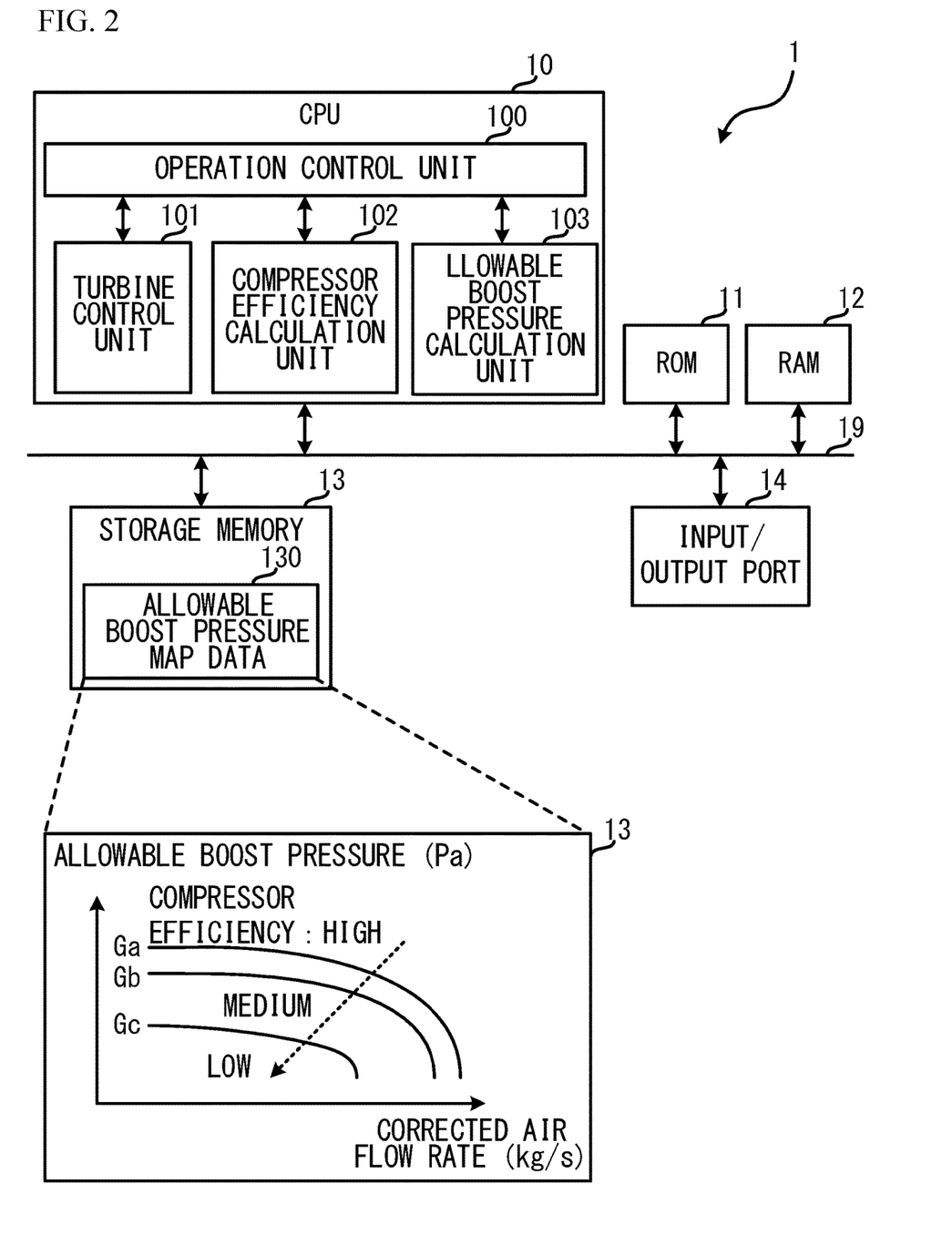
FIG. 2 is a configuration view illustrating an example of an electronic control unit (ECU)

FIG. 2 is a configuration view illustrating an example of the ECU 1. The ECU 1 includes a central process unit (CPU) 10, a read only memory (ROM) 11, a random access memory (RAM) 12, a storage memory 13, and an input/output port 14. The CPU 10 is electrically connected to the ROM 11, the RAM 12, the storage memory 13, and the input/output port 14 via a bus 19 such that signals are input and output from each other.

The ROM 11 stores a program for driving the CPU 10. The RAM 12 serves as a working memory for the CPU 10. The input/output port 14 processes input and output of signals between the CPU 10 and the actuator 51, the inlet pressure sensor 40, the inlet temperature sensor 41, the air flow meter 42, the outlet pressure sensor 43, the outlet temperature sensor 44, the intake pressure sensor 45, the atmospheric pressure sensor 46, the accelerator opening degree sensor 47, the crank position sensor 48, and the like.

Upon reading the program from the ROM 11, the CPU 10 forms, as functions, an operation control unit 100, a turbine control unit 101, a compressor efficiency calculation unit 102, and an allowable boost pressure calculation unit 103.

The operation control unit 100 instructs the turbine control unit 101, the compressor efficiency calculation unit 102, and the allowable boost pressure calculation unit 103 to operate in accordance with a predetermined sequence. Allowable boost pressure map data 130 are stored in the storage memory 13.

The turbine control unit 101 is an example of a control unit. The turbine control unit 101 controls the turbine 31 such that the boost pressure of the turbocharger 3 becomes equal to or lower than the allowable value. Specifically, the turbine control unit 101 calculates the required boost pressure corresponding to the driving state of the engine 2 in accordance with, for example, the detection values of the accelerator opening degree sensor 47 and the crank position sensor 48. The turbine control unit 101 compares the required boost pressure with the allowable boost pressure corresponding to the allowable upper limit rotational speed of the turbine 31. The turbine control unit 101 determines a target boost pressure as a control target in accordance with the comparison result. When the required boost pressure is higher than the allowable boost pressure, the target boost pressure is the allowable boost pressure. When the required boost pressure is equal to or lower than the allowable boost pressure, the target boost pressure is the required boost pressure. The turbine control unit 101 controls the actuator 51 in accordance with the difference between the target boost pressure and the detection value of the intake pressure sensor.

In this way, the turbine control unit 101 controls the turbine 31 by determining the control amount of the actuator 51 based on the boost pressure of the turbocharger 3. Therefore, a rotational speed sensor for detecting the rotational speed of the turbine 31 is not required.

The compressor efficiency calculation unit 102 is an example of a first calculation unit. The compressor efficiency calculation unit 102 calculates a decrease amount of the compressor efficiency of the compressor 30. For example, when the oil mist contained in the exhaust gas of the engine 2 is mixed into the intake air and adheres to the compressor 30 to become a deposit, the compressor efficiency decreases. The means for calculating the decrease amount of the compressor efficiency will be described later.

The allowable boost pressure calculation unit 103 is an example of a second calculation unit. The allowable boost pressure calculation unit 103 calculates the allowable boost pressure based on a corrected air flow rate in the intake passage 20 according to the decrease amount of the compressor efficiency. The allowable boost pressure is an example of an allowable value of the boost pressure according to the upper limit value of the rotational speed of the turbine 31.

For example, the allowable boost pressure calculation unit 103 calculates the allowable boost pressure based on the allowable boost pressure map data 130. As an example, the allowable boost pressure map data 130 indicates a correlation between the corrected air flow rate (kg/s) and the allowable boost pressure (Pa) for each compressor efficiency. The allowable boost pressure calculation unit 103 calculates the allowable boost pressure corresponding to the corrected air flow rate. Here, the corrected air flow rate is a value obtained by correcting the air flow rate detected by the air flow meter 42 based on the air temperature detected by the inlet temperature sensor 41 and the atmospheric pressure detected by the atmospheric pressure sensor 46.

As an example, a symbol Ga indicates a change characteristic of the allowable boost pressure in a case where the compressor efficiency is high. A symbol Gb indicates a change characteristic of the allowable boost pressure in a case where the compressor efficiency is medium. A symbol Gc indicates a change characteristic of the allowable boost pressure when the compressor efficiency is low. As indicated by the dotted arrow, when the corrected air flow rate is a constant value, the allowable boost pressure decreases as the compressor efficiency decreases.

Therefore, it is assumed that the allowable boost pressure calculation unit 103 calculates the allowable boost pressure according to the corrected air flow rate, for example, based only on the correlation corresponding the "high" compressor efficiency. In this case, when the compressor efficiency decreases to "medium" or "low", the allowable boost pressure calculation unit 103 calculates an inappropriate allowable boost pressure exceeding an appropriate value. Therefore, the turbine control unit 101 controls the turbine 31 such that the boost pressure becomes equal to or lower than the inappropriate allowable boost pressure. As a result, the boost pressure may exceed the allowable boost pressure and the turbocharger 3 may be damaged.

Therefore, the allowable boost pressure calculation unit 103 calculates an appropriate allowable boost pressure based on the correlation corresponding to the decreased compressor efficiency in accordance with the decrease amount of the compressor efficiency calculated by the compressor efficiency calculation unit 102. For example, when the compressor efficiency decreases from "high" to "medium", the allowable boost pressure calculation unit 103 calculates the allowable boost pressure from the corrected air flow rate on the basis of the correlation indicated by the symbol Gb. Therefore, the ECU 1 suppresses breakage of the turbocharger 3 by an appropriate allowable boost pressure. The corrected air flow rate is an example of an intake air amount in the intake passage 20.

The allowable boost pressure calculation unit 103 calculates the allowable boost pressure according to the decrease amount of the compressor efficiency based on the allowable boost pressure map data 130 indicating the correlation between the compressor efficiency and the allowable boost pressure. For this reason, for example, the load of the calculation process of the allowable boost pressure decreases as compared with the case where the allowable boost pressure is calculated based on the decrease amount of the compressor efficiency by a predetermined calculation equation.

(Calculation of Decrease Amount of Compressor Efficiency)

The compressor efficiency calculation unit 102 calculates the compressor efficiency at time intervals, and calculates the decrease amount of the compressor efficiency based on the temporal change in the compressor efficiency. For this reason, the compressor efficiency calculation unit 102 calculates the decrease amount of the compressor efficiency with high accuracy, as compared to, for example, the case of calculating the compressor efficiency using map data.

$$\eta c = \varphi/\lambda \tag{1}$$

$$\lambda = Cp\,(\text{Tout}-\text{Tin})/U^2 \tag{2}$$

$$\varphi = Cp\left\{(\text{Pout}/\text{Pin})^{(\kappa-1)/\kappa} - 1\right\}/U^2 \tag{3}$$

$$U = Ncrr \cdot D \cdot \pi/60 \tag{4}$$

$$\eta c = \text{Tin}\left\{(\text{Pout}/\text{Pin})^{(\kappa-1)/\kappa} - 1\right\}/(\text{Tout}-\text{Tin}) \tag{5}$$

A compressor efficiency ηc (%) is calculated based on, for example, a work coefficient λ and a pressure coefficient φ of the compressor 30 according to the above equation (1). The work coefficient λ is calculated based on, for example, a specific heat at constant pressure Cp (J/Kg·K), an outlet temperature Tout (K) and an inlet temperature Tin (K) in the intake passage 20, and a circumferential speed U (m/s) of the impeller of the compressor 30 according to the above equation (2). The outlet temperature Tout and the inlet temperature Tin are acquired from the detection values of the outlet temperature sensor 44 and the inlet temperature sensor 41, respectively. The specific heat at constant pressure Cp is a constant. The outlet temperature Tout is a temperature on the downstream side of the compressor 30. The inlet temperature Tin is a temperature on the upstream side of the compressor 30.

The pressure coefficient φ is calculated based on, for example, the specific heat at constant pressure Cp, the outlet pressure Pout (P) and the inlet pressure Pin (P) in the intake passage 20, a specific heat ratio κ, and the circumferential speed U of the impeller of the compressor 30 according to the above equation (3). The outlet pressure Pout and the inlet pressure Pin are acquired from the detection values of the outlet pressure sensor 43 and the inlet pressure sensor 40, respectively. The specific heat ratio κ is a constant. The outlet pressure Pout is a pressure on the downstream side of the compressor 30. The inlet pressure Pin is a pressure on the upstream side of the compressor 30.

The circumferential speed U is calculated based on, for example, a corrected rotational speed Ncrr (rpm) of the compressor 30, a diameter D (m) of an impeller of the compressor 30, and the circular constant π by the above equation (4). The corrected rotational speed Ncrr is calculated by, for example, a value (N×(Tref/Tin)$^{1/2}$) obtained by correcting a rotational speed N of the compressor 30 by a reference temperature Tref and the inlet temperature Tin. The reference temperature Tref is a constant according to a design.

For example, when the turbocharger 3 is provided with a turbo speed sensor, the rotational speed N of the compressor 30 is acquired from a detection value of the turbo speed sensor. In this case, the compressor efficiency calculation unit 102 calculates the compressor efficiency ηc based on the equations (1) to (4).

However, when the turbocharger 3 is not provided with the turbo speed sensor, the compressor efficiency calculation unit 102 cannot acquire the rotational speed N of the compressor 30. For this reason, the compressor efficiency calculation unit 102 calculates the compressor efficiency ηc based on the outlet temperature Tout, the inlet temperature Tin, the outlet pressure Pout, and the inlet pressure Pin in the intake passage 20 and the specific heat ratio κ by the above equation (5). Here, equation (5) is obtained from equations (1) to (3).

The compressor efficiency calculation unit 102 calculates the decrease amount of the compressor efficiency ηc based on the change in the compressor efficiency ηc when the operating point at which the turbocharger 3 is operated is the same.

Figure 3:
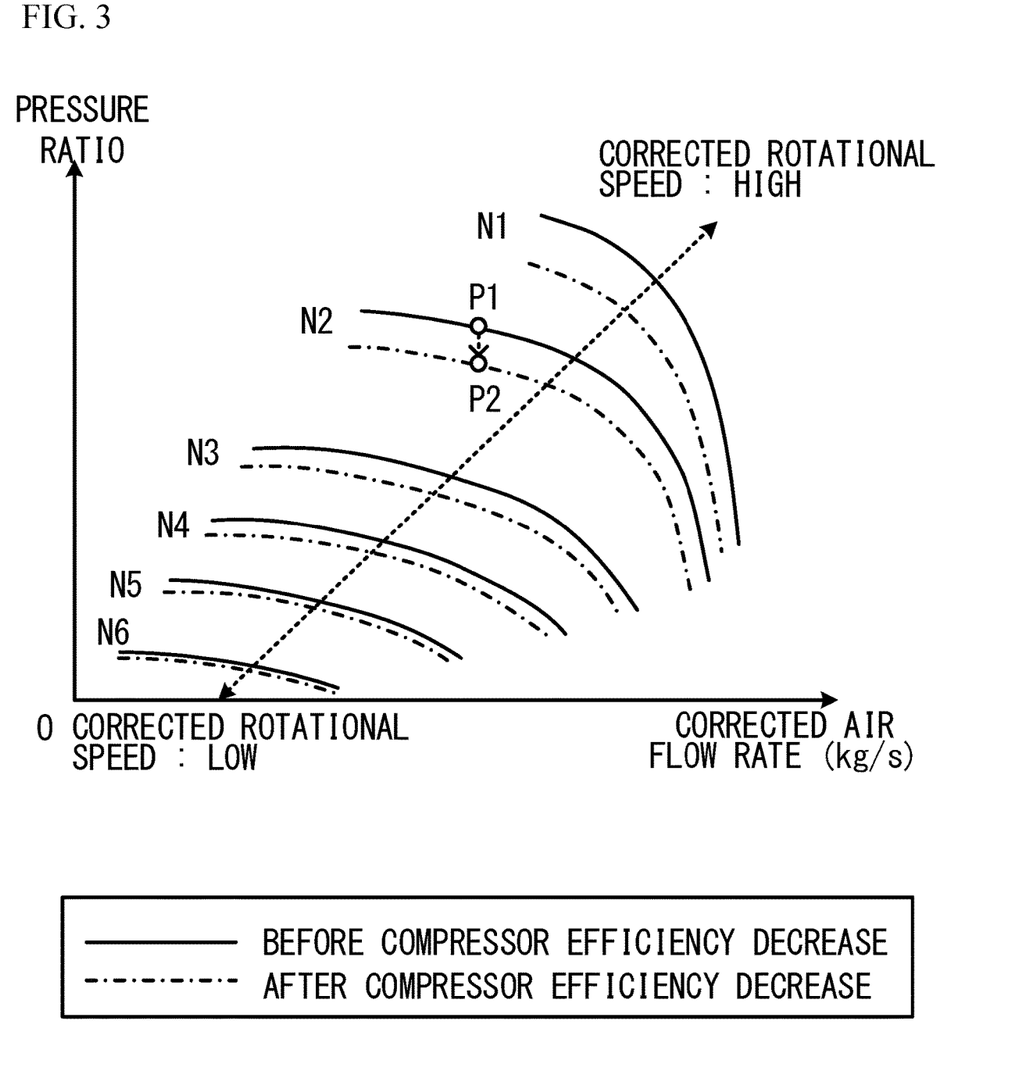
FIG. 3 is a view illustrating an example of operation characteristics of a turbocharger.

FIG. 3 is a view illustrating an example of an operation characteristic of the turbocharger 3. A horizontal axis represents the corrected air flow rate (kg/s), and a vertical axis represents a pressure ratio. The corrected air flow rate is a value (M×(Pref/Pin)×(Tin/Tref)$^{1/2}$) obtained by correcting an air flow rate M detected by the air flow meter 42 with the inlet temperature Tin, the inlet pressure Pin, the reference temperature Tref, and a reference pressure Pref. The reference temperature Tref and the reference pressure Pref are constants according to a design. The pressure ratio is a ratio (Pout/Pin) of the outlet pressure Pout to the inlet pressure Pin.

The operation characteristic is determined for each corrected rotational speed Ncrr of the compressor 30. As an example, operation characteristics in a case where the corrected rotational speed Ncrr is between N1 and N6 are illustrated. Here, among N1 to N6, N1 is the maximum and N6 is the minimum. As the corrected rotational speed Ncrr increases, the corrected air flow rate and the pressure ratio exhibit higher characteristics.

A solid line indicates the operating characteristics before the compressor efficiency decreases. An alternate long and short dash line illustrates the operating characteristic after the compressor efficiency decreases. When the compressor efficiency decreases, the pressure ratio decreases even when the corrected air flow rate is maintained. For example, when the turbocharger 3 operates at an operating point P1 corresponding to the corrected rotational speed Ncrr-N2, if the compressor coefficient ηc decreases, the turbocharger 3 operates at an operating point P2 that is lower than the operating point P1. Therefore, the turbine control unit 101 controls the actuator 51 so as to compensate for the decrease in the compressor efficiency ηc, and increases the rotational speed of the compressor 30.

The compressor efficiency calculation unit 102 calculates a decrease amount of the compressor efficiency ηc based on the outlet temperature Tout, the inlet temperature Tin, the outlet pressure Pout, and the inlet pressure Pin in the intake passage 20. Specifically, the compressor efficiency calculation unit 102 calculates a temporal change in the compressor efficiency ηc calculated at a certain operating point as the decrease amount. Thus, the compressor efficiency calculation unit 102 calculates the decrease amount of the compressor efficiency ηc with high accuracy in accordance with the state of the intake passage 20.

$$Lc = Cp \times M \times \text{Tin} \times \{(\text{Pout/Pin})^{(\kappa-1)/\kappa} - 1\}/\eta c \qquad (6)$$

The energy Lc required to operate the compressor 30 at a certain operating point is expressed by the above equation (6) based on, for example, the specific heat at constant pressure Cp, the above corrected air flow rate M, the inlet temperature Tin in the intake passage 20, the outlet pressure Pout and the inlet pressure Pin in the intake passage 20, the compressor efficiency ηc, and the specific heat ratio κ. Therefore, the energy Lc decreases as the compressor efficiency ηc increases, and the energy Lc increases as the compressor efficiency ηc decreases.

This energy Lc is recovered from the exhaust that rotates the turbine 31. Therefore, when the compressor coefficient ηc decreases, the ECU 1 decreases the opening degree of the WG valve 50 such that the amount of exhaust gas flowing to the turbine 31 increases. Therefore, the control amount of the actuator 51 at the time when the compressor 30 is operated at a certain operating point changes according to the compressor efficiency ηc. That is, since a larger energy Lc is required as the compressor efficiency ηc decreases, the control amount of the actuator 51 is changed so as to reduce the opening degree of the WG valve 50.

The compressor efficiency calculation unit 102 may calculate the decrease amount of the compressor efficiency ηc based on the control amount of the actuator 51 using the above description. In this case, the compressor efficiency calculation unit 102 calculates the decrease amount of the compressor efficiency ηc based on, for example, the correspondence relationship (map data or calculation equation) between the control amount of the actuator 51 (control amount of the turbine 31) and the compressor efficiency ηc for each operating point. As described above, when the compressor efficiency calculation unit 102 calculates the decrease amount of the compressor efficiency ηc based on the change in the control amount of the turbine 31, the load of the calculation process decreases, as compared to the case where the compressor efficiency calculation unit 102 calculates the decrease amount of the compressor efficiency ηc based on the inlet pressure Pin, the outlet pressure Pout, the inlet temperature Tin, and the outlet temperature Tout. Note that the means for calculating the compressor efficiency ηc is not limited to the above, and various methods can be used depending on the system of the vehicle 9.

(Operation of ECU)

Figure 4:
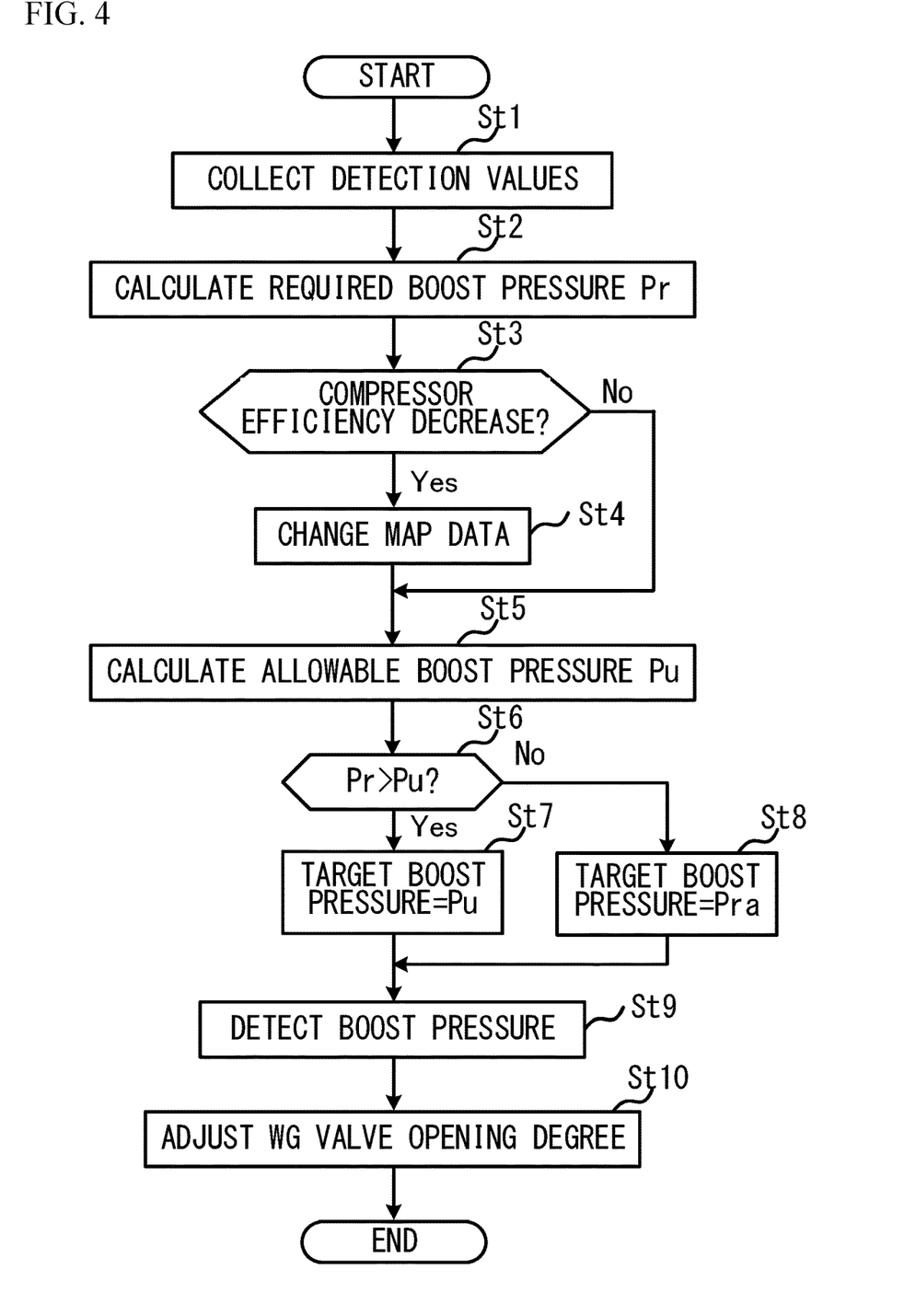
FIG. 4 is a flowchart illustrating an example of control process of a turbine.

FIG. 4 is a flowchart illustrating an example of control process of the turbine 31. This process is executed at a constant cycle, for example. First, the turbine control unit 101 collects the detection values of the accelerator opening degree sensor 47 and the crank position sensor 48 (step St1).

The turbine control unit 101 calculates a required boost pressure Pr corresponding to the driving state of the engine 2 according to each detection value and the like (step St2). Next, the compressor efficiency calculation unit 102 determines whether or not the compressor efficiency ηc decreases (step St3). The decrease determination process of the compressor efficiency ηc will be described later.

When the compressor efficiency ηc decreases (Yes in step St3), the allowable boost pressure calculation unit 103 changes the allowable boost pressure map data 130 in accordance with the decrease amount of the compressor efficiency ηc calculated by the compressor efficiency calculation unit 102 (step St4). Specifically, as described with reference to FIG. 2, the allowable boost pressure calculation unit 103 selects a change characteristic corresponding to the decrease amount of the compressor efficiency ηc from among the change characteristics of the allowable boost pressures indicated by the symbols Ga to Gc, for example. Next, the allowable boost pressure calculation unit 103 calculates the corrected air flow rate and calculates an allowable boost pressure Pu corresponding to the corrected air flow rate based on the allowable boost pressure map data 130 (step St5). When the compressor efficiency ηc does not decreases (No in step St3), the allowable boost pressure map data 130 is not changed, and the process in step St5 is executed.

Next, the turbine control unit 101 compares the allowable boost pressure Pu with the required boost pressure Pr (step St6). When the required boost pressure Pr is higher than the allowable boost pressure Pu (Yes in step St6), the turbine control unit 101 sets the allowable boost pressure Pu as the target boost pressure (step St7). When the required boost pressure Pr is equal to or lower than the allowable boost pressure Pu (No in step St6), the turbine control unit 101 sets the required boost pressure Pr to the target boost pressure (step St8). For this reason, the target boost pressure is suppressed to the allowable boost pressure Pu or less.

Next, the turbine control unit 101 detects the boost pressure by the intake pressure sensor 45 (step St9). Next, the turbine control unit 101 adjusts the opening degree of the WG valve 50 by controlling the actuator 51 according to the difference between the detected boost pressure and the target boost pressure (step St10). Thus, the exhaust gas corresponding to the target boost pressure flows through the turbine 31. The control process of the turbine 31 is executed in this way.

Figure 5:
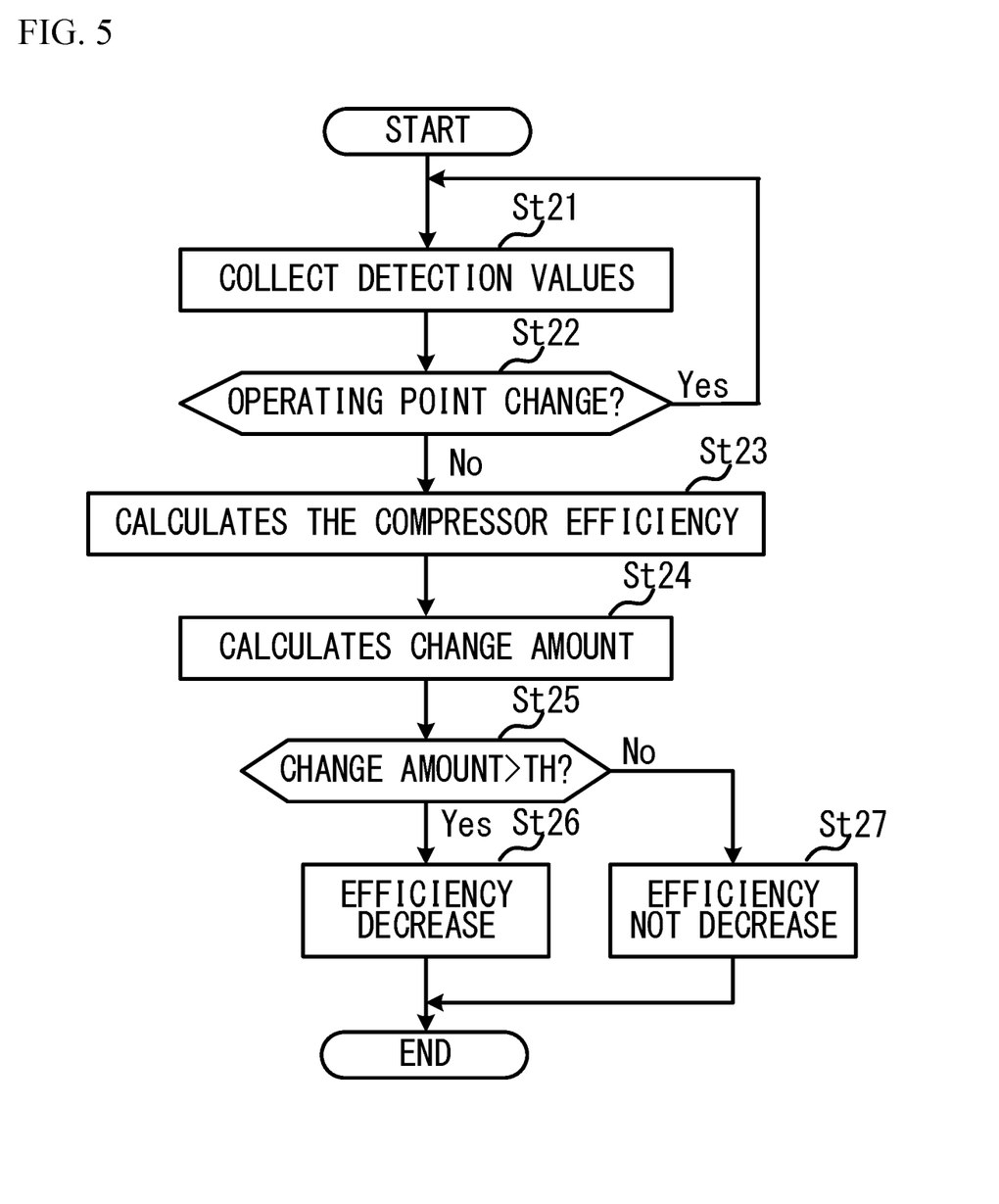
FIG. 5 is a flow chart illustrating an example of a compressor efficiency reduction determination process.

FIG. 5 is a flowchart illustrating an example of a process of determining a decrease in compressor efficiency. This process is executed, for example, at regular intervals.

First, the compressor efficiency calculation unit 102 collects detection values from the inlet pressure sensor 40, the inlet temperature sensor 41, the outlet pressure sensor 43, and the outlet temperature sensor 44 (step St21). Next, the compressor efficiency calculation unit 102 specifies the operating point in the operating characteristics of the compressor 30 by calculating two parameters among the corrected air flow rate, the corrected air flow rate, and the corrected rotational speed, and determines whether or not the operating point changes from when the present process was executed last time (step St22). When the operating point changes (Yes in step St22), the process in step St21 is executed again.

When the operating point does not change (No in step St22), the compressor efficiency calculation unit 102 calculates the compressor efficiency ηc based on the detected values according to the above equation (5) (step St23). In a case where the turbocharger 3 is provided with a turbo speed sensor, the compressor efficiency calculation unit 102 may calculate the compressor efficiency ηc based on each detection value by the above-described equations (1) to (4). As described above, the compressor efficiency calculation unit 102 may calculate the compressor efficiency ηc based on the control amount of the actuator 51. Next, the compressor efficiency calculation unit 102 calculates the amount of change in the compressor efficiency ηc based on the calculated value when the present process was executed last time (step St24). That is, the temporal change amount of the compressor efficiency ηc is calculated.

Next, the compressor efficiency calculation unit 102 compares the temporal change amount of the compressor efficiency ηc with a threshold value TH (step St25). When the temporal change amount is equal to or smaller than the threshold value TH (No in step St25), the compressor efficiency calculation unit 102 determines that the compressor efficiency ηc does not decrease (step St27). When the temporal change amount is greater than the threshold value TH (Yes in step St25), the compressor efficiency calculation unit 102 determines that the compressor efficiency ηc decreases (step St26). In this case, the compressor efficiency calculation unit 102 outputs the temporal change amount of the compressor efficiency ηc to the allowable boost pressure calculation unit 103 as the decrease amount. The compressor efficiency reduction determination process is executed in this manner.

Although some embodiments of the present disclosure have been described in detail, the present disclosure is not limited to the specific embodiments but may be varied or changed within the scope of the present disclosure as claimed.

What is claimed is:

1. A control device for a turbocharger including a turbine, disposed in an exhaust passage of an internal combustion engine, and a compressor, disposed in an intake passage of the internal combustion engine and driven by the turbine,
the control device comprising:
a memory, and
a processor coupled to the memory,
wherein the processor is configured to:
control the turbine such that a boost pressure of the turbocharger in the intake passage becomes equal to or lower than an allowable value corresponding to an upper limit rotational speed of the turbine to suppress damage to the turbocharger,
calculate a decrease amount of a compressor efficiency of the compressor, and
calculate the allowable value based on an intake air amount in the intake passage, in accordance with the decrease amount.

2. The control device according to claim 1, wherein the processor is configured to calculate the compressor efficiency at time intervals, and to calculate the decrease amount based on a temporal change in the compressor efficiency.

3. The control device according to claim 1, wherein the processor is configured to calculate the decrease amount based on a first pressure and a first temperature on an upstream side of the compressor in the intake passage and on a second pressure and a second temperature on a downstream side of the compressor in the intake passage.

4. The control device according to claim 1, wherein the processor is configured to calculate the decrease amount based on a change in a control amount of the turbine.

5. The control device according to claim 1, wherein the processor is configured to calculate the allowable value based on data indicating a correlation between the compressor efficiency and the allowable value, in accordance with the decrease amount.

* * * * *